United States Patent Office 3,834,988
Patented Sept. 10, 1974

3,834,988
METHOD OF MAKING GLUCOSE ISOMERASE AND USING SAME TO CONVERT GLUCOSE TO FRUCTOSE
Kenneth K. Shieh, St. Louis County, Howard A. Lee, Rock Hill, and Brendan J. Donnelly, St. Louis County, Mo., assignors to Anheuser-Busch, Incorporated, St. Louis, Mo.
No Drawing. Filed Oct. 10, 1972, Ser. No. 296,000
Int. Cl. C07g 7/02
U.S. Cl. 195—66 R                 24 Claims

ABSTRACT OF THE DISCLOSURE

This disclosure relates to the use of microorganisms of the genus *Actinoplanes*, and particularly to the species *Actinoplanes missouriensis*, to produce glucose isomerase in large quantity even in the absence of xylose in the growth medium. The preferred growth medium is neutralized corn steep liquor which has had the sludge removed.

BACKGROUND OF THE INVENTION

Fructose is generally regarded to be substantially sweeter than glucose. However, glucose is readily available from inexpensive sources. A practical and economical process for the conversion of glucose to fructose is therefore desirable. The alkali isomerization of glucose to fructose gives either low yield or tends to produce undesirable side products at yields higher than 30%. An alternative to the use of alkali has been the utilization of enzymes to effect this conversion and a considerable effort has been expended to achieve this in an economical and efficient manner.

There are several enzymes which convert D-glucose to D-fructose which involve one or more chemical intermediates (e.g. D-glucose-6-phosphate) but these do not appear to be practical at the present time. More promising are enzymes that convert D-glucose to D-fructose directly. A number of these enzymes have been prepared from micro-organisms of the genera Lactobacillus, Pseudomonas, Pasteurella, Leuconostoc, Streptomyces and Aerobacter (see review by Yamaka in Biochim. Biophys, Acta 154, 670-680 [1968]). In order that a significant quantity of glucose isomerase be formed by any of the foregoing micro-organisms, xylose or xylan must be present in the growth medium to induce the enzyme. Pure xylose is relatively expensive, and when xylan is used in the growth medium, the micro-organism must also produce enzymes capable of hydrolyzing the xylan.

In order to overcome the expense of growing the micro-organism in a xylose or xylan containing medium, efforts have been expended to obtain a bacterium that will produce the enzyme constitutively. Lee, Hayes and Long (U.S. Pat. 3,645,848) have disclosed that certain strains of micro-organisms belonging to the genus Arthrobacter are capable of producing enzymes that directly convert glucose or xylose to the corresponding ketose when grown in a medium in which xylose or xylan is absent. Unfortunately, relatively small amounts of isomerase are produced and the growth medium requires relatively expensive nitrogen sources, such as yeast extract and meat protein.

SUMMARY OF THE INVENTION

Accordingly one of the principal objects of the present invention is to provide a method of selecting and growing micro-organisms possessing enzymes for converting aldoses to ketoses. More specifically, an object of this invention is to provide a method for isomerizing aldoses, such as glucose and xylose, to the corresponding ketoses using enzymes produced by bacterial cells.

This invention comprises a process of producing glucose isomerase using micro-organisms of the genus *Actinoplanes* and further comprises the conversion of glucose to fructose using said isomerase.

DETAILED DESCRIPTION

We have discovered that micro-organisms belonging to the genus *Actinoplanes* are capable of producing glucose isomerase when grown in a medium in the complete absence of xylose or xylan. In addition, relatively large quantities of glucose isomerase can be produced by *Actinoplanes* in a medium consisting of corn steep liquor, salts, and tap water. The enzyme exhibits a high degree of temperature stability in that temperatures as high as 80–85° C. can be used in the isomerization without significant loss of activity. Either whole cells or cell free extracts may be used to effect isomerization.

Stock cultures are generally cultivated in a medium containing sources of carbon, nitrogen, (usually corn steep liquor) and inorganic salts. The inocula may be prepared by growing the organisms in this medium on a rotary shaker at approximately 25–30° C. in the presence of air for 1–2 days. The inoculum, comprising 3% to 10% of the final volume of the fermentor, is transferred to the sterile medium contained in a suitable fermentor. The inoculated medium is incubated with agitation at from 16 to 40° C., preferably 25°–30° C., while maintaining an air flow of one volume per minute for 1 to 7 days. The air flow may range from 0.3 to 1.5 volumes per minute. For maximum yield of enzyme, the pH of the fermentation should be maintained between 6.0 and 8.5, preferably between 6.4 and 7.5. Maximum isomerase activity is achieved under these conditions in 3 to 5 days. The whole cells are then harvested and used as such or, alternatively, the enzyme may be extracted from the cells using techniques known to the art.

Activity levels approaching 30 units per milliliter of culture broth have been reached in 3 days. A unit of activity is defined as that quantity of enzyme which will produce 1 micromole of fructose from glucose in 1 minute at 75° C. in 1.5 M glucose, 0.03 M phosphate buffer at pH 7.0, 0.003 M magnesium sulfate, and 0.0003 M cobaltous sulfate.

The isomerase activity levels obtainable in the practice of this invention vary, depending upon the particular strain and growth medium employed. Activity levels of 50 units per ml. of culture broth have been observed in the case of *Actinoplanes missouriensis* NRRL B–3342 grown in corn steep liquor.

The following examples illustrate the practice of this invention and it should be understood that the invention is not limited thereto:

It is specifically desired and intended to include subcultures, natural mutants, variants and the like, as well as mutants artificially produced from the aforesaid organism by means of irradiation with X-rays or ultraviolet light, treatment with chemical agents and the like.

EXAMPLE I

This example illustrates the production of glucose isomerizing enzyme from a number of *Actinoplanes* species, namely *Actinoplanes missouriensis* NRRL B–3342, *Actinoplanes philippinensis* ATCC 12427, *Actinoplanes armeniacus* ATCC 15676, and *Actinoplanes* sp. ATCC 23342.

These micro-organisms are preserved separately in stock culture on slants composed of 1.7% of Tryptone, 0.3% of Soytone, 0.25% of glucose, and 2.0% agar. The inoculum is prepared by transferring the micro-organisms from the stock culture to a test tube containing 8 ml. of sterilized medium consisting of 1.7% of Tryptone, 0.3% Soytone, 0.25% $K_2HPO_4$ and 0.25% glucose. The inoculum is cultivated in this test tube at 28° C. for 2–3 days with shaking. This inoculum is then inoculated into one of the following growth media to produce glucose isomerizing enzyme.

MEDIUM NO. I

|  | Percent |
|---|---|
| Tryptone | 1.7 |
| Soytone | 0.3 |
| $K_2HPO_4$ | 0.25 |
| D-xylose | 1.0 | and made up to volume with tap water.

The pH of the culture medium was adjusted to about 7.0. Sugar and other nutrients were sterilized separately and then mixed.

MEDIUM NO. II

The medium is prepared as Medium No. I, but 0.25% D-glucose was substituted for all of the D-xylose.

MEDIUM NO. III

| Corn Steep Liquor | percent | 3 |
|---|---|---|
| $CoSO_4$ | mM | 0.1 |
| $CuSO_4$ | mM | 0.05 |

The preparation of the growth medium from corn steep liquor is outlined in Example II which appears hereinafter.

The pH of the culture was 7.0 in all cases.

Other suitable media include distiller's solubles, peptone yeast extract, casein hydrolyzate, soybean hydrolyzate, and fish protein hydrolyzate. It should be understood that mixtures of any of the described media may be used.

Growth was started by adding 5 ml. of respective inoculum to 75 ml. of Tryptone-Soytone medium or to 95 ml. of corn steep liquor medium in a 250 ml. Erlenmeyer flask. The cells were incubated for 96 hours at 28° C. with shaking on a G-25 New Brunswick Scientific Gyrotary Shaker at 280 r.p.m.

The cells were collected by centrifuging 30 ml. of the culture at 15,000 r.p.m. for 10 minutes. The cells were washed once with tap water and suspended in 14 ml. of 0.12 M phosphate buffer (pH 7.0). The cell suspension was then sonified at 4° C. for 4 minutes in Branson Sonifier J-17A and then centrifuged at 15,000 r.p.m. for 15 minutes. The supernatant fluid was used as a crude source of glucose isomerizing enzyme. The activity of glucose isomerase was determined as follows: to 3.0 ml. of 2.0 M glucose, 0.004 M $MgSO_4$ and 0.0004 M $CoSO_4$ solution was added a crude enzyme solution in 0.12 M phosphate buffer pH 7.0 to a final volume of 4.0 ml. The reaction was carried out at 75° C. Aliquots were taken at 10, 15, 20 and 25 minutes and diluted in 0.02 M HCl.

The fructose content of the samples was assayed in an automatic analyzer by adapting the skatole-HCl method described by Pogell [J. Biol Chem. 211: 143 (1954)]. The color development was carried out at 52° C. as opposed to 37° C. Activity of glucose isomerizing enzyme was calculated from the slope and expressed in units (U). A unit of activity is defined as that quantity of enzyme which will produce 1 micromole of fructose from the glucose in 1 minute at 75° C. under the conditions indicated in the previous paragraph.

Production of glucose isomerizing enzyme by various species of Actinoplanes micro-organisms after growing in Tryptone-Soytone medium or corn steep liquor is shown in Table I. All of these micro-organisms are able to produce glucose isomerizing enzyme in the presence or absence of D-zylose in the growth medium. However, the presence of D-xylose significantly increases the production of this enzyme.

TABLE I

Production of glucose isomerase by several species of Actinoplanes

| | Specific activity, U/mg. protein | | |
|---|---|---|---|
| Growth | Medium No. 1 (no xylose) | Medium No. 2 (D-xylose) | Medium (corn steep liquor) |
| Micro-organisms: | | | |
| Actinoplanes missouriensis NRRL B-3342 | 15.2 | 20.6 | 17.8 |
| Actinoplanes philippinensis ATCC 12427 | 0.87 | 2.0 | 0.29 |
| Actinoplanes armeniacus ATCC 15676 | 0.10 | 0.82 | 0.24 |
| Actinoplanes sp. ATCC 23342 | 0.48 | 1.70 | 0.41 |

Corn steep liquor can be used as a growth medium to produce glucose isomerizing enzyme in the absence of D-xylose. The most potent production of glucose isomerizing activity was noted by the species Actinoplanes missouriensis NRRL B-3342. All subsequent examples were carried out using this particular micro-organism.

EXAMPLE II

The method of prepartion of the corn steep liquor has a significant effect on the production of enzyme with Actinoplanes missouriensis. Various methods for the neutralization of the corn steep liquir were examined. After neutralization to pH 7.0 with the alkali, the corn steep liquor was filtered to remove the sludge, consisting largely of phytates, and used for growth according to the method in Example I with the addition of cobaltous sulfate an cupric sulfate salts at a concentration of 0.1 mM. and 0.05 mM., respectively.

The use of sodium hydroxide as compared to lime or ammonium hydroxide gives the best enzyme production as indicated in Table II. Potassium hydroxide also is a suitable alkali.

TABLE II

Effect of Neutralizing Agents for Corn Steep Liquor on the Production of Glucose Isomerase

| Neutralizing Agent: | Production of Enzyme U/ml. Culture Broth |
|---|---|
| Lime | 17.2 |
| $NH_4OH$ | 23.3 |
| NaOH | 27.8 |

The removal of the sludge after neutralization is essential as indicated by the results in Table III. Corn steep liquor was neutralized to pH 7.0 and made up to 500 ml. in a 1 liter Erlenmeyer flask equivalent to 3% solids. The calculation of percent solids is based on the original solids as described by the manufacturer. Any solid that may be removed by filtration are not taken into account when calculating the final solids content. Cobaltous and cupric salts were added as above. The cells were grown at ambient temperatures for 4 days on a New Brunswick G-50 Shaker at 280 r.p.m.

TABLE III

Effect of Removal of Sludge of Corn Steep Liquor on Production of Glucose Isomerase from Actinoplanes missouriensis

| Growth medium: | Production of Enzyme (U/ml. of culture broth) |
|---|---|
| Sludge not removed | 2.5 |
| Sludge removed | 23.5 |

EXAMPLE III

The quantity of glucose isomerase produced by the micro-organism is affected by the organic nitrogen source present in the medium as shown in Table IV. The data in Table IV were obtained by growing the micro-organism in 100 ml. of broth in a 250 ml. Erlenmeyer flask for 3 days on the G-25 New Brunswick Shaker at 28° C. and 280 r.p.m. The level of organic nitrogen solids was adjusted to 2%, neutralized, and filtered and supplemented with 250 mg. glucose, 22 mg. $K_2HPO_4$ and 11 mg. $MgSO_4 \cdot 7H_2O$ and made up to volume with tap water. The medium was sterilized for 15 minutes at 121° C. The cells were harvested, sonified and the activity of the enzyme measured. Results are expressed as units of activity per milliliter of culture broth.

Corn steep liquor showed the greatest activity and is the preferred organic nitrogen source.

TABLE IV

Effect of organic nitrogen source on the production of glucose isomerase

| Organic nitrogen source | Source | Activity, U/ml. culture | Percent |
|---|---|---|---|
| Corn steep liquor | Anheuser-Busch | 17.8 | 100 |
| O.M. peptone | Amber Lab | 13.4 | 75 |
| Casein hydrolyzate (Amber EHC). | do | 13.0 | 73 |
| Bacto-Soytone | Difco Lab | 11.8 | 66 |
| Yeast extract (BYF-100) | Amber Lab | 10.3 | 58 |
| Distiller's dried solubles | National Distiller's Products. | 7.9 | 44 |
| Yeast extract (BYF-300) | Amber Lab | 5.8 | 33 |
| Bactopeptone | Difco Lab | 5.2 | 29 |
| Yeast extract (BYF 50X) | Amber Lab | 4.3 | 24 |
| Malt extract | Difco Lab | 2.5 | 14 |
| Atlantic Menhaden peptone. | Haynie products | 1.1 | 6 |

EXAMPLE IV

The optimal concentration of neutralized sludge removed corn steep liquor (as solids) for the production of enzyme was found to be 3% as shown in Table V. The concentration can vary from 0.5% to about 7% by weight of the medium. Growth conditions were as set forth in Example III except that the growth medium did not contain glucose and was supplemented with 2.5 mg. of $CoSO_4 \cdot 7H_2O$. The cells were grown for 4 days, harvested and assayed according to the procedure in Example I.

TABLE V

Effect of Concentration of Corn Steep Liquor on the Production of Enzyme

| Percent Corn Steep Liquor | Production of Enzyme U/ml. Culture |
|---|---|
| 0.5 | 9.6 |
| 1.0 | 22.3 |
| 2.0 | 23.6 |
| 3.0 | 29.4 |
| 4.0 | 23.4 |
| 5.0 | 23.4 |
| 6.0 | 21.8 |

EXAMPLE V

The effect of various carbohydrate sources on the production of glucose isomerase from *Actinoplanes missouriensis* was examined. A moderate stimulatory effect was noted in the case of fructose. From about 0.1% to about 2% fructose by weight of the medium is the preferred range when fructose is added. The data in Table VI was obtained by the addition of 0.25% w./v. carbohydrate to the growth medium containing 3% corn steep liquor and other nutrients and conditions as in Example I.

TABLE VI

Effect of Carbohydrates on the Production of Enzyme

| Carbohydrate Source | Enzyme act. U/ml. culture |
|---|---|
| None | 28.0 |
| D-xylose | 30.0 |
| D-fructose | 35.2 |
| D-galactose | 31.5 |

As can be seen in Table VI, D-xylose is not necessary for the production of glucose isomerase and its mild stimulatory effect would probably not justify its use commercially.

EXAMPLE VI

The addition of various metal ions to the growth media of *Actinoplanes missouriensis* was found to affect the production of glucose isomerase. Cells were grown according to the procedure in Example IV in 3% corn steep liquor except that additional salts were added only where indicated in Table VII.

TABLE VII

Effect of Metal Ions on the Production of Glucose Isomerase from *Actinoplanes missouriensis*

| Addition | Enzyme Production U/ml. Culture Broth |
|---|---|
| None | 22.8 |
| $Co^{++}$(0.1 mM.) | 27.3 |
| $Co^{++}$(0.1 mM.) $Mg^{++}$(0.45 mM.) | 27.0 |
| $Co^{++}$(0.1 mM.) $Cu^{++}$(0.05 mM.) | 30.0 |

From about 0.05 mM. to about 0.5 mM. cobalt ions and from about 0.01 mM. to about 0.1 mM. copper ions may be added.

EXAMPLE VII

The production of glucose isomerase was found to be affected by the initial pH of the growth medium. The optimal initial pH was found to be 7.0 as shown in Table VIII. The growth medium was prepared by neutralizing the corn steep liquor with NaOH, filtering and subsequently adjusting to the desired pH, and used according to the conditions in Example IV.

TABLE VIII

Effect of initial pH of growth medium on the growth and production of enzyme

| Initial pH | Production of enzyme, U/ml. culture | Growth, mg. soluble protein/ml. culture |
|---|---|---|
| 8.5 | 2.4 | 0.20 |
| 8.0 | 2.4 | 0.17 |
| 7.5 | 18.3 | 1.14 |
| 7.0 | 27.8 | 1.80 |
| 6.5 | 18.7 | 1.35 |
| 6.0 | 11.0 | 0.95 |
| 5.5 | | (a) |
| 5.0 | | (a) | a No growth.

Protein determinations were by the method of Lowery (J. Biol. Chem. *193*: 265 [1951]) on enzyme extracts.

EXAMPLE VIII

*Actinoplanes missouriensis* was found to grow and produce the glucose isomerase activity over a wide range of temperatures. The optimal growth temperature as shown in Table IX was found to be 28° C. The data for Table IX were obtained by growing the micro-organism for 2–4 days at from 16° C.–45° C. in the corn steep liquor medium described in Example I.

TABLE IX

Effect of growth temperature on the production of enzyme

| Growth temperature, ° C. | Growth period, days | Production of enzyme, U/ml. of culture | Growth, mg. of soluble protein/ culture |
|---|---|---|---|
| 16 | 4 | 5.2 | 0.92 |
| 20 | 4 | 18.4 | 1.68 |
| 24 | 4 | 24.4 | 2.04 |
| 28 | 4 | 29.4 | 2.40 |
| 32 | 4 | 24.1 | 1.83 |
| 36 | 2 | 16.0 | 1.66 |
| 40 | 2 | 6.6 | 0.47 |
| 45 | 3 | | (a) | a No growth.

EXAMPLE IX

Production of enzyme from *Actinoplanes missouriensis* NRRL B–3342 is effected in a New Brunswick MF 114 fermentor with automatic pH and foam control. Ten liters of medium were prepared using corn steep liquor that had been adjusted to pH 7.0 with NaOH, filtered and made up to volume with tap water. Sufficient corn steep liquor (50% solids) was used to give a final concentration of 4%. Loss of solids on neutralization and filtration was not taken into account when calculating the final solids content. The medium was supplemented with 0.1 mM. cobaltous sulfate and 0.05 mM. cupric sulfate and sterilized at 121° C. for 30 minutes. Growth was for 5 days at 30° C. with pH controlled at 7.0 by the automatic addition of 2 M $H_2SO_4$. Agitation was 200 r.p.m. and aeration was 1 volume per minute. The fermentation was started by the addition of 10% of a 24 hour inoculum made from the same medium. At the end of the growth period the culture broth contained 56 units of activity per milliliter.

EXAMPLE X

The isomerization of glucose to fructose may be effected by using either whole cells or cell free extracts. The pH of the isomerization may vary from about 5.5 to about 9, but the optimum pH was found to be 7.0 as shown in Table X. The enzyme is remarkably temperature stable with appreciable activity remaining at 90° C. The enzyme used in these experiments was derived from *Actinoplanes missouriensis* grown in the Tryptone Soytone medium without D-xylose described in Example I.

Enzyme activity was expressed as units per ml. of crude enzyme solution prepared according to the method described in Example I. The conditions of the experiment were those of the activity assay except where a suitable phosphate buffer was substituted to obtain the desired pH as in Table X or the temperature varied as in Table XI. The data of Table X have been corrected for non-enzymatic conversion. The glucose concentration is greater than about 0.1 M.

TABLE X

Effect of pH on the Activity of Glucose Isomerase

| pH | Act. U/ml. |
|---|---|
| 5.0 | 6.5 |
| 5.5 | 16.1 |
| 6.0 | 28.0 |
| 6.5 | 45.0 |
| 7.0 | 50.5 |
| 7.5 | 45.0 |
| 8.0 | 39.4 |

TABLE XI

Glucose Isomerase Activity as a Function of Temperature

| Temperature ° C. | Activity U/ml. |
|---|---|
| 40 | 4.5 |
| 50 | 9.1 |
| 60 | 20.7 |
| 70 | 43.5 |
| 75 | 57.5 |
| 80 | 74.5 |
| 85 | 127.0 |
| 90 | 158.4 |

EXAMPLE XI

Divalent cations have a profound effect on the activity of glucose isomerase prepared as for the preceding example. The most profound effect has been noted with magnesium and cobalt. Tables XII and XIII describe the results of the addition of magnesium to a cell free enzyme extract and the additional enhancement of activity afforded cobalt. Conditions of the assay with the exception of the concentration of divalent cations is that described for the activity assay.

$Mg^{++}$ is added in the range from 0.1 mM. to about 9 mM., preferably 0.3 mM.; $Co^{++}$ is added from about 0.05 mM. to about 0.6 mM., preferably from 0.1 to 0.3 mM.

TABLE XII

Effect $Mg^{++}$ on the Activity of Glucose Isomerizing Enzyme

| Concentration of $MgSO_4$ (mM.) | Enzyme Activity U/ml. |
|---|---|
| 0 | 4.8 |
| 0.5 | 25.0 |
| 1.0 | 41.2 |
| 2.0 | 44.3 |
| 3.0 | 43.5 |
| 4.0 | 43.5 |

TABLE XIII

Activity of Glucose Isomerase as a Function of $Co^{++}$ Concentration in the Presence of 3.0 mM. $MgSO_3$

| Concentration of $CoSO_4$ (mM.) | Enzyme Activity U/ml. |
|---|---|
| 0 | 44.0 |
| 0.2 | 49.0 |
| 0.3 | 54.0 |
| 0.4 | 54.0 |

EXAMPLE XII

Whole cells (1.8 g. wet cells from a shake flask culture of *Actinoplanes missouriensis*) were suspended in 100 ml. 60% w./v. glucose, 2 ml. 18 mM. $CoSO_4$, 2 ml. 0.2 M $MgSO_4$ and 10 ml. pH 7.5, 0.32 M phosphate (K) buffer and incubated in a water bath at 75° C. for 4 hours. The cells were removed by vacuum filtration through Whatman #1 filter paper. 50% of the glucose was found to have been converted to fructose. Identification of products was by means of thin-layer chromatography [J. Chromatog, *34*, 26–34 (1968)]. Identification and quantification of comparable conversions have been confirmed by gas chromatography of the trimethylsilyl derivatives (R. L. Whistler and J. N. BeMiller, Methods in Carbohydrate Chemistry Vol. VI, p. 2, Academic Press, New York, 1972).

What is claimed is:

1. A process for production of glucose isomerizing enzyme from a micro-organism belonging to the genus of *Actinoplanes* comprising the steps of growing *Actinoplanes* in a culture medium and recovering a glucose-isomerizing enzyme therefrom.

2. The process of claim 1 wherein the micro-organism is *Actinoplanes missouriensis*.

3. The process of claim 1 wherein the micro-organisms is *Actinoplanes philippinesis*.

4. The process of claim 1 wherein the micro-organism is *Actinoplanes armeniacus*.

5. The process of claim 1 wherein the micro-organism is *Actinoplanes* sp. ATCC 23342.

6. The process of claim 1 wherein the growth medium is selected from the group consisting of corn steep liquor, distiller's solubles, casein hydrolyzate, soybean hydrolyzate, peptone, yeast extract, and fish protein hydrolyzate.

7. The process of claim 1 wherein the growth medium is corn steep liquor from which a substantial portion of the sludge has been removed following neutralization with alkali.

8. The process of claim 7 wherein the corn steep liquor is substantially neutralized and the precipitates are removed therefrom.

9. The process of claim 8 wherein the corn steep liquor is treated with sodium hydroxide, calcium hydroxide, ammonium hydroxide or potassium hydroxide to substantially neutralize the same.

10. The process of claim 7 wherein the micro-organism is *Actinoplanes missouriensis*, and the growth medium has a corn steep liquor concentration of 0.5% to about 7% solids, the pH is between about 6.0 and about 8.5, the temperature is between about 16° C. and about 40° C.

11. The process of claim 10 wherein the growth medium contains from about 0.05 mM to about 0.5 mM. of cobaltous ion and from about 0.01 mM. to about 0.1 mM, copper ion.

12. The process of claim 10 wherein the fermentation is continued for about 24 to about 168 hours.

13. The process of claim 10 including the step of adding D-xylose to the growth medium in an amount of about 0.5% to about 1% by weight of the medium.

14. The process of claim 10 including the step of adding D-fructose to the growth medium in an amount of about 0.1% to about 2.0% by weight of the medium.

15. A process for converting D-glucose to D-fructose including the step of treating D-glucose with an isomerase produced by a micro-organism of the genus *Actinoplanes*.

16. The process of claim 15 wherein the isomerization is in the presence of magnesium ion in the range of from about 0.1 mM. to about 9 mM.

17. The process of claim 16 wherein the isomerization takes place at a temperature of about 40° C. to about 90° C. and a pH of about 5.5 to about 9 and a glucose concentration greater than about 0.1 M.

18. The process of claim 16 wherein the isomerization takes place in the presence of cobaltous ions in the range of about 0.05 mM. to about 0.6 mM.

19. The process of claim 15 wherein the enzyme is in whole cell form.

20. The process of claim 15 wherein the enzyme is in cell free form.

21. The process of claim 15 wherein the isomerase is produced by the microorganism *Actinoplanes missouriensis*.

22. The process of claim 15 wherein the isomerase is produced by the microorganism *Actinoplanes philippinesis*.

23. The process of claim 15 wherein the isomerase is produced by the microorganism *Actinoplanes armeniacus*.

24. The process of claim 15 wherein the isomerase is produced by the microorganism *Actinoplanes* sp. ATCC 23342.

References Cited

Chem. Abstracts 74:61055w.
Chem. Abstracts 72:128714g.

A. LOUIS MONACELL, Primary Examiner

THOMAS G. WISEMAN, Assistant Examiner

U.S. Cl. X.R.

195—31 F, 6.7